May 8, 1962          D. C. BOND          3,033,287
GEOCHEMICAL PROCESS

Filed Aug. 4, 1959          2 Sheets-Sheet 1

INVENTOR.
DONALD C. BOND
BY
ATTORNEY

May 8, 1962  D. C. BOND  3,033,287
GEOCHEMICAL PROCESS
Filed Aug. 4, 1959  2 Sheets-Sheet 2
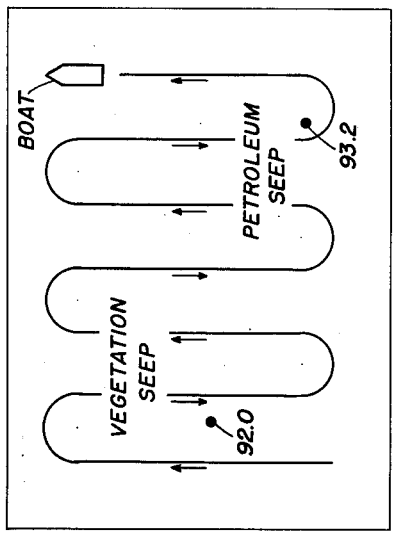
FIG. 3 — WATER SURVEY OF $C^{12}/C^{13}$ RATIOS
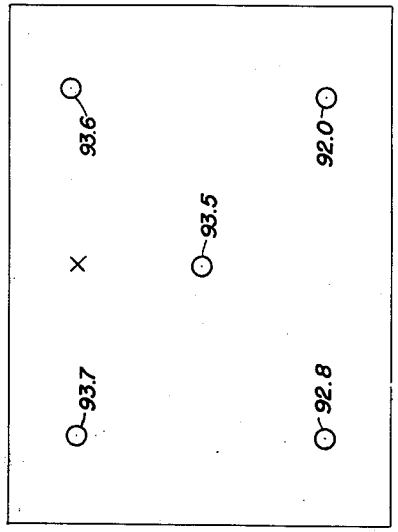
FIG. 2 — LAND SURVEY OF $C^{12}/C^{13}$ RATIOS
INVENTOR.
DONALD C. BOND
BY
ATTORNEY

United States Patent Office 3,033,287
Patented May 8, 1962

3,033,287
GEOCHEMICAL PROCESS
Donald C. Bond, Crystal Lake, Ill., assignor to The Pure
Oil Company, Chicago, Ill., a corporation of Ohio
Filed Aug. 4, 1959, Ser. No. 831,664
19 Claims. (Cl. 166—4)

This invention relates to a subsurface geologic method. It is more directly concerned with an interpretation of stratigraphic, structural and economic values below the earth's surface. This invention is further concerned with geochemical prospecting and also tracing of subterranean strata by recovering gas samples from cores or other earth samples or from bodies of water under which petroleum reservoirs are suspected to lie and analyzing for the presence of hydrocarbon gases such as methane, and in particular for the ratio of methane containing the $C^{12}$ isotope to methane containing the $C^{13}$ isotope.

Primary subsurface geologic techniques are directed to prospecting for concealed, subterranean deposits of liquid or gaseous hydrocarbons. Another phase of subsurface geology is concerned with formation correlation. Correlating sedimentary strata involves the matching up of similar lithologies from well to well to provide information useful in a variety of applications. A number of these are set forth in "Subsurface Geologic Methods," Le Roy, Colorado School of Mines, including construction of composite geologic sections, coordinating surface and subsurface sequences, exploring and developing natural resources, etc. Survey methods selected for carrying out these various phases depend upon a number of factors; however, in each instance an appropriate criterion or indicator is employed to provide the basic intelligence which is interpreted to yield stratigraphic and structural information. These criteria vary from the acoustical properties of rocks, to the presence of fish teeth and scales. Where exploration for petroleum reservoirs is extended to bodies of water, such as lakes and shallow seas, under which it is suspected that petroleum may lie, samples are sometimes taken of water at various points on the surface and analyzed for the presence of dissolved hydrocarbons which may indicate the proximity of a petroleum reservoir.

One type of geologic survey relies on chemical or physical analysis of terranean samples. This technique finds application in prospecting for subterranean reservoirs. In Subsurface Geological Methods, L. W. Le Roy states:

"The occurrence of any substance in the earth's surface in unusual concentrations tends to shift the equilibrium value of the various chemical, physical and biological factors in the immediate environment to an abnormal position. The problem of the prospector, then, becomes one of recognizing deviations from normal conditions."

The low-molecular-weight, gaseous hydrocarbons present in the reservoir will penetrate the overburden and migrate upwardly to the earth's surface. Accordingly, one phase of geochemical prospecting has been devoted to a correlation of the analysis of terranean soil-gas samples with the proximity of subterranean deposits of gaseous and/or liquid hydrocarbons. In obtaining gas samples for analysis, the gas sample may be secured directly in the field by collecting samples of air at or near the earth's surface, or indirectly by gathering samples of soil from the area to be studied and subsequently analyzing these samples to determine the composition of the gas contained therein. In previous work which has been done, quantitative and qualitative measurements have been made of the respective amounts of the normally gaseous hydrocarbons present and the results of the soil-gas analyses graphically presented and correlated with the respective geographic position from which the soil-gas samples were obtained. The result of this graphical presentation provides a ring, or halo, of high values surrounding the commercial production. Chemical analysis and identity of formation constituents also can be employed in correlation work. Because methane is generally an important, albeit minute, gaseous constituent of soil gases obtained in proximity to petroleum hydrocarbon reservoirs, the relatively large amounts of this substance which would be available would increase the accuracy of gas analyses. However, in this work investigators have eschewed the use of the methane fraction because, being a product of organic decay and a vapor from crude oil and/or natural gas, it has been felt that its presence would not predict the proximity of petroleum hydrocarbon reservoirs. According to this invention, there has been found a new and novel method of geochemical prospecting involving a different type of gas analysis, which preferably employs methane concentrations as an index of the proximity of the location from which the sample was obtained to deposits of petroleum. While this invention is directed primarily to an analysis of gas samples obtained at or near the earth surface, it may also be employed in studying the fundamental geochemical characteristics of an area, by means of samples secured at selected points along a bore-hole during the course of the drilling operation, by collecting cuttings and analyzing the soil-gas contained in the cuttings, or analyzing the gas contained in the circulating stream of drilling mud. In addition, gas samples can be obtained from subterranean cores by means of sidewall coring devices. Still another means for obtaining gas samples for analyses is by degasifying formation water produced. When prospecting for petroleum underlying lakes or shallow seas, gas samples can be obtained continuously or intermittently at predetermined locations over the surface of the water and such samples dried and analyzed for the presence of hydrocarbons which may indicate the proximity of a petroleum reservoir. Collection of soil samples and recovery of the gaseous constituents occluded therein is adequately discussed in the prior art. For examples, see Subsurface Geologic Methods, cited supra, at p. 764, et seq.; Am. Assoc. Petroleum Geologists Bull., 24, pp. 859–881, as well as references on geochemical prospecting and well logging cited by Uren, Petroleum Production Engineering Development, 3rd. ed., McGraw-Hill, 1946; Patent literature which discusses sampling techniques includes U.S. Patents 2,192,525, 2,324,085, 2,336,612, and others.

It is one object of this invention to employ geochemical techniques in subsurface geology.

It is another object of this invention to provide a geochemical prospecting method.

An additional object of this invention is to apply geochemical principles to formation correlation surveys.

Still another object of this invention is to utilize an analysis of a selected substance from a subterranean source as an index of the proximity of subterranean accumulations of gaseous and/or liquid hydrocarbons, or as a formation correlation indicator.

It is a further object of this invention to provide a means for exploring for subterranean deposits of liquid and/or gaseous hydrocarbons by analyses of gas samples collected from earth or water samples obtained from locations in the proximity of hydrocarbon-containing reservoirs.

It is a still further object of this invention to employ in geochemical prospecting or well logging, a soil-gas or water-dissolved-gas analysis as an index of the proximity of the location from which the gas sample was obtained to subterranean accumulations of gaseous and/or liquid petroleum hydrocarbons.

Yet another object is to use the analysis of gas from drilling mud as a means of determining if a well is situated above a petroleum deposit.

Still another object is to prospect for petroleum underlying a body of water by analyzing dry gases obtained from water samples for methane content and distinguishing methane of petroleum origin by its high $C^{12}/C^{13}$ isotopic ratio.

These and other objects will become more apparent from the following detailed description of this invention.

FIGURE 2 is a diagrammatic view of a land area showing the $C^{12}/C^{13}$ isotopic ratios determined for gases obtained from earth samples at the various positions indicated.

FIG. 3 is a diagrammatic view showing a water survey in exploration for petroleum deposits underlying a body of water in which water samples are measured for methane content and the $C^{12}/C^{13}$ isotopic ratio determined to indicate whether the methane is of vegetable origin, or from a deep underlying petroleum reservoir.

Figure 1:
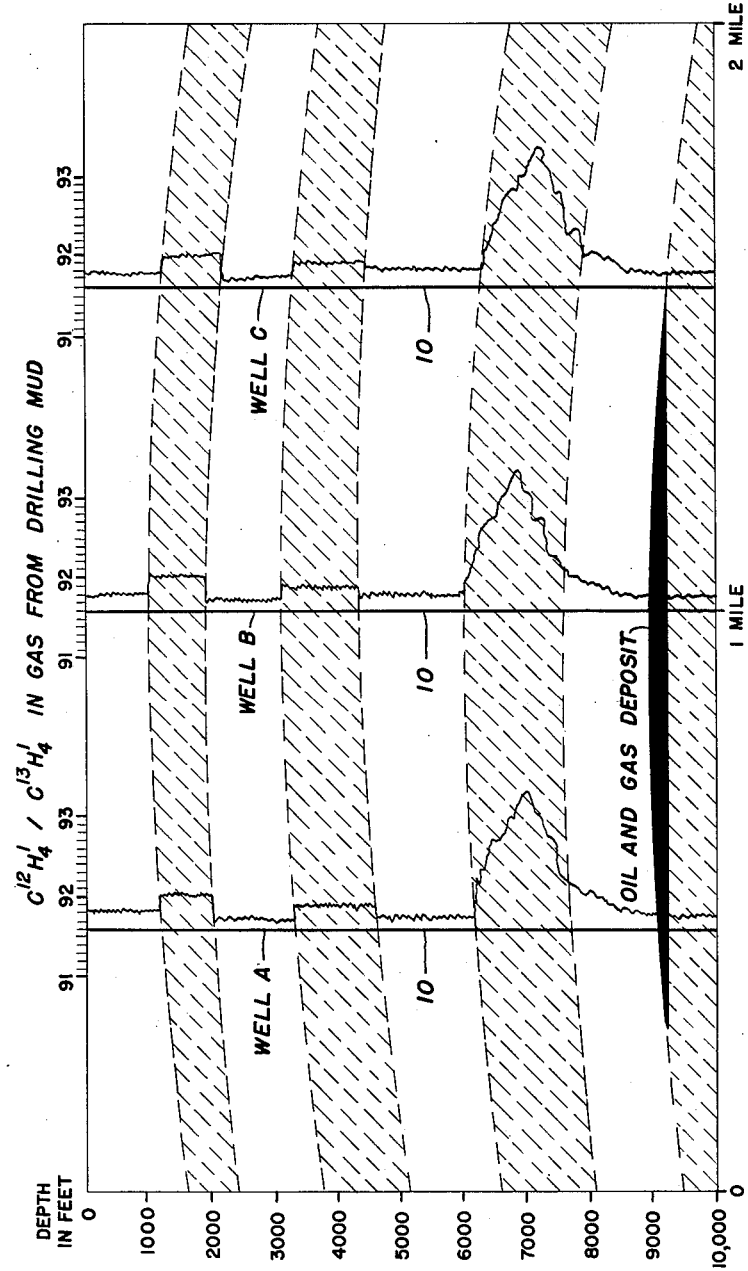
FIGURE 1 shows a correlation of isotopic ratio logs made in well bores along a two-mile section. Naturally-occurring organic materials contain varying proportions of isotopic hydrogen and carbon, i.e., $H^{1,2,3}$ or $C^{12,13}$.

A mathematical relationship can be developed which facilitates interpretation by differentiating between small differences in the ratios of the concentrations of isotopic constituents occurring in various substances. For example, Craig in Geochim et Cosmochim Acta, 3, pp. 53–92, 1953, developed the expression:

$$\frac{C^{12}}{C^{13}} = \frac{88.89}{\left(1 + \frac{\delta}{1000}\right)}$$

when $\delta$ is reported for the following materials (Geochim et Cosmochim Acta, 6, pp. 186–196, 1954).

Source material:      $C^{13}$ (per mil.)

| Source material | $C^{13}$ (per mil.) |
|---|---|
| Marine limestone | +2.4 to −3.3 |
| Recent shells | +1.9 to −3.8 |
| Atlantic Ocean bicarbonate | −1.3 to −2.9 |
| Atmospheric $CO_2$ | −7.4 to −9.9 |
| Marine plants and animals | −8.1 to −17.9 |
| Normal terrestrial plants | −21.1 to −32.1 |
| Fossil wood | −22.4 to −27.3 |
| Coal | −21.6 to −27.2 |
| Paleozoic and younger marine shales and slates | −26.1 to −30.8 |
| Petroleum | −23.0 to −29.4 |
| Huronian shales and slates | −28.5 to −30.7 |
| Graphite from gneiss, pegmatite and marble | −2.7 to −19.7 |
| Igneous rocks | −19.0 to −26.0 |

Similarly, natural methane gas contains a certain amount of heavy methane, of molecular weight 17, with negligible amounts of methane having molecular weights of 18 and higher. The heavy methane is principally $C^{13}H_4^1$, although there is a small amount of $C^{12}H_3^1H^2$. According to this invention, the ratio of normal methane to heavy methane can be used in geochemical exploration and/or well logging to indicate the proximity of petroleum hydrocarbon reservoirs or the location and porosity of subterranean strata.

It is known that natural gas diffuses upward from petroleum reservoirs, often as much as several hundred or even thousands of feet. The movement of this gas is revealed by analysis of drilling mud, or in some cases by the detection of gas seeps. It is possible that some of this gas moves through fractures in the rock, but much of it moves by the extremely slow process of diffusion through the tight shale or other seal bed over the reservoir. It has been found that methane originating from certain petroleum reservoirs has a delta value of about −7, i.e., $C^{12}/C^{13}$=about 89.5. In the diffusion of the gas upward, there is a fractionation of the ordinary methane from the heavy methane, since $C^{12}H_4^1$ diffuses more rapidly than $C^{13}H_4^1$, thereby producing a diffusion front in which the $C^{12}H_4^1/C^{13}H_4^1$ concentration ratio varies considerably from the normal ratio. The first part of the diffusion front is rich in $C^{12}H_4^1$ with lesser amounts than normal of $C^{13}H_4^1$ being present. The proportion of light methane to heavy methane gradually decreases with depth, as the petroleum reservoir is approached until the normal $C^{12}H_4^1/C^{13}H_4^1$ ratio for methane present in a petroleum reservoir obtains. The composition of diffusing gas and the enrichment with respect to the ordinary methane, as a function of depth and time, can be calculated by the methods given by Senftle and Bracken, Geochim et Cosmochim, Acta, 61–75 (1955).

In employing the instant invention as a geochemical well-logging technique, the gas evolved from drilling mud, or other borehole source, during the drilling operation, is collected according to conventional sampling procedures and analyzed to determine the ratio, $C^{12}H_4^1/C^{13}H_4^1$. If this ratio is found to be normal, it is concluded that the gas originated in a small, local, non-commercial gas pocket. On the other hand, if the drilling mud gas sample is found to be deficient in heavy methane ($C^{13}H_4^1$), it is concluded that the gas has diffused up from a deeper reservoir, thereby affording a means of predicting the probable success or failure of a drilling operation before it is complete.

The invention also has application as a geochemical prospecting method. In this service, soil-gas samples are gathered at intervals over an area to be examined in accordance with a definite grid or profile. These samples are analyzed to determine their $C^{12}H_4^1/C^{13}H_4^1$ ratio. Any considerable departure from the normal value is taken as a favorable indication of the presence of a buried reservoir. A maximum value of the ratio will be found directly above a petroleum reservoir, if the diffusion front has risen to, and is co-extensive with, the earth's surface. If the diffusion front occurring directly over the petroleum reservoir has passed through the earth's surface, then those sections of the diffusion front which are radially diffusing toward the earth's surface will produce the well-known "halo" effect. However, if the normal ratio is found, the probability of the existence of an underground reservoir is doubtful, but the area is not necessarily condemned as a drilling prospect, because the diffusion front may not have reached the point at which the samples were collected. Therefore, the certainty of conclusions based on my method is increased if the samples are taken from as great a depth as is practical.

As has been pointed out, techniques that have been perfected for the sampling of soils for hydrocarbon analysis may be used in the process of this invention. It is preferred that the soil sample be taken to the laboratory, where the gas is removed for analysis.

As in other geochemical methods and techniques, the interpretation of the results of the subject geologic survey depends upon comparing abnormal results with normal conditions. If the samples of soil-gas have not diffused or effused a considerable distance through the earth, the normal ratio of ordinary methane to heavy methane will be in the range from about 89.5 to 93.5, which normal ratio should be determined for each area. However, if the gas has diffused up from a considerable depth, it will be relatively deficient in heavy methane. That is, the ratio of ordinary methane to heavy methane will be of the order of 0.5–2.5 units above normal, although, in some cases, the ratio may be several units higher; and, in unusual instances, the amount of heavy methane will be so small that the ratio will be relatively large. In general, any deviation in the ratio greater than about 1.0 unit from the normal is considered to be very significant, but if sufficient care is taken in the measurements, deviations in ratios in the range from 0.5–1.0 unit from the normal also may be concluded to be indicative of the presence of petroleum. Even smaller deviations from normal are useful under ideal conditions.

It will be found that in the drilling of a well, if no sizable petroleum deposit exists underground at that point, small amounts of gas will occasionally be found in the mud. In this gas the ratio of ordinary to heavy methane will lie in the range 89.5–93.5/1. If the well is situated over a petroleum deposit, small amounts of gas, derived from the petroleum deposit, will be detected in the drilling mud and in the drill cuttings, or cores, at a considerable distance above the deposit. In many cases, gas will be detected 50–100 feet above the deposit, often several hundred feet above the deposit, and, in some cases, as much as several thousand feet or more above the deposit. The point at which a detectable amount of gas appears depends on the effective permeability of the seal-bed, or cap-rock, over the reservoir; the thickness of the seal-bed; the age of the reservoir; and the effect of disturbing factors, such as underground water flows or rock fractures. In general, it is found that gas is discovered at a greater distance above the reservoir if the seal-bed is relatively poor, that is, the seal-bed is thin or has comparatively high permeability. The presence of gas from the buried reservoir will be indicated by a deviation from the normal value previously determined for the area for the ratio of ordinary methane to heavy methane. If there is little or no local accumulation of gas (that is, gas not derived from the large, deep deposit), the ratio will be several units higher than normal. As drilling proceeds, the gas in the mud shows a decreasing ratio and the normal value is approached as the well penetrates the reservoir proper.

In the case of analysis of soil-gas samples, samples of soil are taken at a depth of at least 3 to 4 feet, although a depth of 6 to 10 fet is preferable in order to minimize surface contamination. About 1 to 5 gallons of the soil is taken to the laboratory, where the absorbed gas is removed by vacuum, heating, or both. After suitable purification, the soil-gas is analyzed in the mass spectrometer and the ratio of ordinary to heavy methane is determined. Initially, the sampling points can be relatively widely spaced, of the order of 1,000 feet to 1 mile apart.

If the normal value for the area for this ratio is obtained, there is no indication of the persence of a buried petroleum deposit. Any ratio more than 0.5 unit above normal is interpreted as indicating the presence of a petroleum deposit. After the preliminary samples from widely-spaced locations have been analyzed, any area showing gases with significantly high ratios is then sampled more intensively, with sampling points closer together, and the results of analyses of the new samples are used to pinpoint the location of the deposit. Of course, the results of the soil-gas analyses must be interpreted in the light of available geological knowledge of the area, such as seismic or gravimetric survey results, surface geology, etc., so that the effects of disturbing factors, such as fractures, underground water flow, etc., can be properly evaluated. In order to illustrate the invention, the following examples are typical:

*Example I*

In the drilling of a wildcat well, various small amounts of gas are detected in the drill cuttings. Analysis shows these to be normal deposits containing methane and heavy methane in the proportion 89.5:1. At a depth of 5,000 feet, a small amount of gas is obtained in the cuttings, about 5 parts per million by weight, while drilling through shale. Analysis shows that the ratio of ordinary to heavy methane in this gas is 92.1. As drilling proceeds, larger amounts of gas are obtained and the ratio of ordinary to heavy methane decreases to a value of 89.5/1 at a depth of 6,500 feet, when a reservoir of clean sand is penetrated that produces 42° A.P.I. gravity crude oil with gas at a gas-oil ratio of 700 cu. ft. per bbl.

*Example II*

Soil samples are taken from a depth of 5 feet, on a grid pattern with sampling points 2,500 feet apart, over an area five miles square. A portion of the survey area is shown in FIG. 2. An analysis of several samples gives an average $C^{12}H_4/C^{13}H_4$ ratio for the area of 92.0. Two of these samples are found to contain ordinary methane and heavy methane in proportions of 93.7:1 and 93.6:1, respectively, while the other samples show the proportion of ordinary to heavy methane to be the normal proportion of 92.0:1. An additional sample taken intermediate between two points showing a normal ratio and two of the points showing a high ratio of ordinary to heavy methane shows a value of 93.5:1 for the ratio of ordinary to heavy methane, thus indicating that the higher values for this ratio represent the "halo" effect and that a desirable area for drilling is within a circle which includes the points having a high proportion of ordinary to heavy methane. Subsequent drilling at the point indicated by the $x$ in FIG. 2 shows that a petroleum reservoir is present at a depth of about 3,200 feet.

*Example III*

Prospecting for petroleum reservoirs underlying bodies of water, such as lakes and shallow seas, has been carried out by making systematic analyses of water samples taken at predetermined points on a body of water to determine the presence of dissolved hydrocarbons which may indicate the presence of a petroleum seep. One method of taking such samples requires a barge or boat, equipped with infrared analyzer, to follow a predetermined course over a body of water and continuously or intermittently take water samples, remove dissolved air and gases from the water, dry such gas samples, and plot the hydrocarbon content as indicated by the infrared analyzer. Generally, the vessel follows a zigzag course, moving upstream, and when dissolved hydrocarbon is detected in the water, the location of the seep from which it came is pinpointed by continuing the analysis while following a decreasing spiral course.

While the method just described is of some commercial use, it obviously cannot distinguish between local, uncommercial (marsh gas) deposits (i.e., gas evolved from decaying vegetation at the bottom of the lake or sea or at a relatively shallow depth below the earth's surface) and gas evolved from deeper, potentially commercial gas or oil deposits. My process of geochemical exploration, as described in the previous examples, is capable of distinguishing between gases which come from deposits relatively close to the surface and gases evolved from deeper potentially commercial petroleum reservoirs.

In this embodiment of the invention, a boat or barge is moved along a substantially zigzag path, as shown in FIG. 3, carrying a mass spectrometer which is adjusted to give a very accurate measurement of the relative proportions of methanes containing the $C^{12}$ and $C^{13}$ isotopes. As is indicated elsewhere in this specification, methane which originates in a petroleum reservoir or from localized pockets of decaying vegetation has a $C^{12}/C^{13}$ ratio of about 89.5–93.5. When methane has diffused from a deep source, it becomes enriched with respect to $C^{12}$ content and the $C^{12}/C^{13}$ ratio increases above normal. Therefore, when methane is detected which has a normal $C^{12}/C^{13}$ ratio, it can be concluded that it originated from a source relatively close to the earth's surface. On the other hand, the detection of methane having a $C^{12}/C^{13}$ ratio of the order of 1.0–2.0 units higher than normal for the area indicates that the gas has diffused from a relatively deep reservoir. In carrying out this invention, the boat carrying the mass spectrometer moves in a zigzag pattern and continuously or intermittently analyzes dried gas samples for the relative proportion of $C^{12}$ and $C^{13}$.

In FIG. 3, there is shown the pattern of movement of the boat and an indication that a methane seep having a $C^{12}/C^{13}$ ratio of 92.0 is detected in the area indicated as "vegetation seep." Since the $C^{12}/C^{13}$ isotopic ratio found in gas samples taken at this point is the normal ratio for the area and thus indicates a localized pocket of gas or decaying vegetation close to the earth's surface, the boat continues its zigzag pattern in an attempt to find an indication of a commercial reservoir. In the area marked "petroleum seep" the mass spectrometer detects a methane seep having a $C^{12}/C^{13}$ isotopic ratio of 93.2. This isotopic ratio indicates that the methane has diffused from a relatively deep reservoir and has become enriched with respect to the $C^{12}$ isotope as a result of the more rapid diffusion of that isotope in accordance with Graham's law. After finding evidence of methane having a $C^{12}/C^{13}$ ratio of 90.8, the boat turns back and follows a pattern of movement in the form of a decreasing spiral in an attempt to pinpoint the seep from which the methane has originated. Subsequent drilling at the point showing the highest isotopic ratio in FIG. 3 shows that a petroleum reservoir of very substantial size is present at a depth of about 7,000 feet. While this description of operation of this process has been made with special emphasis upon prospecting for petroleum deposits in shallow waters, it is apparent that this process would be equally applicable to prospecting for petroleum seeps in deeper lakes and seas. In fact, the practical operability of this process is not affected by the depth of the water in which the prospecting is carried out.

Although in the foregoing examples and detailed description of this invention, specific reference has been made to the use of heavy methane as the indexing gas, other gaseous substances obtained directly or occluded in said samples can be used. This includes the use of a hydrogen ($H^1$)-deuterium ($H^2$) ratio as well as ratios of $C_2$–$C_4$ hydrocarbons containing isotopes of carbon. However, it is preferred that heavy methane be used. Although heavy methanes having molecular weights of other than 17 are known, the higher-molecular-weight methanes are present in such insignificant amounts that their application in the subject invention is impractical, and cannot be relied upon.

The instant invention in its application as a geologic survey tool is principally used as a complementary technique in conjunction with conventional gravimetric, magnetic, seismic, and electrical geologic survey methods. It provides an improvement over prior art geochemical techniques employing total hydrocarbon analysis. In these methods, interpretation is generally difficult because of large variations in the statistical data obtained, which prevents the facile establishment of a meaningful norm. This requires that substantial deviations from normal concentrations must occur in order to permit interpretation, a situation which does not generally obtain. By employing heavy methanes as the indexing gases, there is available a constant normal, and, as a result, slight variations from this normal are readily detectable and are significant. It is to be noted that the stated normal ratio of light or normal methane to heavy methane of about 89.5–93.5 was based upon extensive analyses of gas samples of terranean origin. Therefore, a more comprehensive routine survey in the particular geographical location under survey is necessary to determine the normal ratio for the area. In any event, the deviation at the diffusion front from the established normal will be sufficient to permit a palpable interpretation of the data for application in determining the location of naturally occurring, underground, petroleum reservoirs.

Because gases in sedimentary deposits have different isotopic compositions, an isotope concentration ratio is useful as a well-logging expedient for the correlation of strata.

Very small amounts of hydrocarbons are present in most sediments, and the $C^{12}/C^{13}$, or $H^1/H^2$, concentration ratios in these can be determined by means of a mass spectrometer, designed for measuring small differences in isotope concentrations. Similarly, the $C^{12}/C^{13}$ concentration ratio in the carbonate content of various rock samples from an area may be measured to determine which samples have substantially the same ratios. The $C^{12}/C^{13}$ and $H^1/H^2$ concentration ratios in the hydrocarbons from various sediments are substantially constant over a considerable area for sediments laid down during the same period in time, but deviations therefrom are evident in the isotope ratios in samples from strata laid down during different geological periods. The same considerations apply to the $C^{12}/C^{13}$ ratio in the carbonate content of rocks. Conventional prior art correlation techniques cannot be used in some areas such as in Kansas or river delta areas where "lenses" of sandy deposits predominate, and in other areas of such carbonate deposits, because contemporary deposits do not extend laterally far enough to permit correlation. In contradistinction, a given isotope ratio will be substantially constant from point to point throughout a given stratum laid down at the same period of time. Accordingly, the location of a stratum throughout an area can be traced regardless of the composition of the sediment by employing a selected isotopic ratio as the correlation indicator. Even in areas where underground water movement, etc., disturb the pattern of isotope ratios in the diffusing methane to the point where it cannot be used in detecting deep-buried petroleum deposits, the reproducibility of the isotope ratio laterally within a given formation makes this ratio useful for correlation purposes.

The technique utilized in correlation work is simple. Boreholes are drilled over the area in which the subsurface sedimentary strata to be correlated occur. Core samples may be collected either during a core-drilling operation, or by conventional sidewall coring devices in the event that a correlation is to be made in an area in which a plurality of well bores are located. Gas is removed from these cores by application of heat or vacuum. Or, preferably, gas samples are obtained from drilling mud during the drilling process, in the conventional manner. In preparing the samples for mass spectrometric measurements, care must be taken to avoid isotopic fractionation. That is, repeated distillation or absorption processes must be avoided. After isotopic concentration ratios have been determined for the constituent that has been selected as the correlation indicator, these data are plotted versus depth to provide a well log. The logs from a plurality of wells scattered over the area under consideration will permit a stratigrapher to trace formations or key beds from one location to another.

*Example IV*

Reference to FIGURE 1 shows in a specific illustrative manner the application of this invention in geologic surveys including stratigraphic correlations and geochemical prospecting. Here is shown a longitudinal cross-section of a geological structure favorable to the accumulation of petroleum, illustrated in a simple asymmetric anti-clinal fold. A plurality of boreholes 10 which penetrate the various strata are drilled to a depth of 10,000 feet (vide: Subsurface Geologic Methods, cited supra, pp. 609 et seq.) For each well drilled, an isotopic log is prepared employing a $C^{12}/C^{13}$ ratio for the methane constituent of the gas recovered from the drilling mud as the correlation indicator. The various formations penetrated are characterized by the isotopic ratios noted in the well logs obtained for each well. It is seen that for the persistent strata shown, each has a characteristic isotopic ratio which serves as horizon marker for correlation purposes, thereby facilitating the developing of structural and stratigraphic relationships for the area under consideration. Although small variations in the magnitude of 0.1 unit are obtained, the use of sensitive apparatus such as that described above permits distinctions to be made for the various strata traversed. From wells surveyed in this manner, the declination and course of formations can be determined and valuable maps and records thereby derived. For additional applications of the correlation data obtained in accordance with this invention reference is made to Petroleum Production Engineering, Development, Uren, 3rd ed., McGraw-Hill, Chap. XVI. Also illustrated is the more definitive change in isotopic ratio which is encountered at the diffusion front of methane which is migrating to the surface.

The example illustrates the use of $C^{12}H_4^1/C^{13}H_4^1$ ratio in gas from drilling mud as an aid in correlation of strata. In the interval from 4,000 feet to 7,000 feet, there are mixed sands and shales which are difficult to correlate by the usual methods. From the distinctive shape of the ratio log (ratio vs. depth) for the three wells, it is possible to correlate strata and reveal the presence of an anticline that contains a petroleum deposit penetrated by well #2. In the example shown, the diffusion front has not reached the surface, so this case cannot be used to demonstrate the application of the ratio method in exploration by analysis of surface samples of soil-gas. The enrichment with respect to $C^{12}H_4^1$ at a certain depth (e.g., about 5,000 ft. in well #2) illustrates the use of the ratio method in detecting a deeper petroleum deposit.

Although a $C^{12}/C^{13}$ isotopic ratio for methane was employed in the illustrative examples, other isotopic constituents can be employed. In general, the abundance of isotopes of carbon, hydrogen, nitrogen, etc., in sedimentary strata, as well as gases emanating from subterranean petroleum reservoirs, is sufficient to permit a spectrometric analysis to determine the specific isotopic ratio being employed. Because isotopic constituents of the samples employed in the prospecting method or correlation technique are present in relatively small amounts, and especially because of the difficulty in distinguishing between ordinary methane and heavy methane, ultrasensitive detection and quantitative techniques must be employed. Although a number of methods are available, the mass spectrometer has been found to be the one best adaptable for the analysis of soil-gas for the micro-quantities of methane and heavy methane present in soil-gas. Although mass spectra, which are used for the qualitative determination of isotopes, can be produced by conventional mass spectrometers having an accuracy of better than 1%, preferably 0.1–0.01%, best results are obtained when a mass spectrometer especially designed for that purpose is used. Such an instrument is commercially available from the Consolidated Engineering Corporation. This instrument is adapted from a design of A. O. Nier, described in Rev. Sci. Inst., 18, p. 398 (1947). A detailed description of the apparatus is given by McKinney et al., Rev. Sci. Instruments, 21, 724 (1950). With this instrument variations in $C^{12}H_4^1/C^{13}H_4^1$ ratios can be detected with an accuracy of about 0.01%. Because the handling of analytical samples, operation of the instrument, and calculations are well-known in the prior art, no attempt will be made to give a detailed description of this collateral aspect of the invention. For greater detail, reference is made to Petroleum Processing, p. 515 May 1949; Symposium on Spectroscopy in Petroleum Industry, ACS Meeting, April 1955; and references cited therein.

It is seen from the foregoing explanation that this invention is concerned with the application of the determination of isotopic ratios as criteria in several subsurface geologic survey methods. The ratio of isotopic constituents (in particular the $C^{12}/C^{13}$ ratio) can be employed as an indexing means in petroleum reconnaissance techniques to determine the proximity of subterranean reservoirs of petroleum liquids and gases, either by analysis of soil-gas samples or by analysis of gas samples obtained from the surface of a body of water overlying a prospecting area. Additionally, this ratio can be utilized as an indicator in subsurface geologic, stratigraphic correlations, as described in connection with FIG. 1. This application is a continuation in part of my copending applications Serial No. 555,783, filed December 28, 1955, and Serial No. 620,996, filed November 8, 1956, both now abandoned.

What is claimed is:

1. A method for recovering oil from subsurface geological formations comprising (1) collecting samples of material selected from the group consisting of water and earth in a prospecting area; (2) removing occluded and adsorbed gases from said samples; (3) quantitatively and qualitatively analyzing said gases for respective amounts of constituents containing isotopes selected from the group consisting of $H^1$, $H^2$, $C^{12}$, and $C^{13}$ whereby the ratio of the amount of a first, normally gaseous constituent containing a lower-atomic-weight isotope to the amount of a second, normally gaseous constituent, having the same composition as said first constituent but containing the higher-atomic-weight isotope of the same element, can be ascertained; (4) correlating these isotopic ratios with the normal ratio of the amount of said first constituent to the amount of said second constituent to ascertain abnormal fluctuations in said ratios which manifest the propinquity of subsurface accumulations of petroleum hydrocarbons; and (5) drilling at least one well in the region of greatest fluctuation of said ratio.

2. A method in accordance with claim 1 in which the gases from said samples are quantitatively and qualitatively analyzed for the respective amounts of methanes of molecular weights 16 and 17, respectively.

3. A method for recovering oil from subsurface geological formations comprising analyzing subsurface gas samples taken over a predetermined surface area to determine the ratio of the carbon isotopes $C^{12}$ and $C^{13}$ therein, and drilling a well within the region of the maximum $C^{12}/C^{13}$ isotopic ratio.

4. A geochemical method of exploration for petroleum reservoirs underlying a body of water which comprises (1) collecting water samples from said body of water; (2) removing and drying dissolved gases from said samples; (3) quantitatively and qualitatively analyzing said gases for respective amounts of constituents containing isotopes selected from the group consisting of $H^1$, $H^2$, $C^{12}$, and $C^{13}$ whereby the ratio of the amount of a first, normal gaseous constituent containing a lower-atomic-weight isotope to the amount of a second, normally gaseous constituent, having the same composition as said first constituent but containing the higher-atomic-weight isotope of the same element, can be ascertained; and (4) correlating these isotopic ratios with the normal ratio of the amount of said first constituent to the amount of said second constituent to ascertain abnormal fluctuations in said ratios which indicate the proximity of subsurface accumulations of petroleum hydrocarbons.

5. A method in accordance with claim 4 in which the gases from said samples are quantitatively and qualitatively analyzed for the respective amounts of methanes of molecular weights 16 and 17, respectively.

6. A method in accordance with claim 5 in which the dried gas samples are analyzed with a mass spectrometer carried on a boat from which the samples are taken.

7. A geochemical method of exploration for petroleum reservoirs underlying a body of water which comprises (1) operating a boat in a predetermined path on said body of water and collecting water samples along the path of the boat; (2) removing and drying dissolved gases from said water samples; (3) passing the dried gas samples through a mass spectrometer and analyzing the same for relative proportions of methanes containing the stable isotopes $C^{12}$ and $C^{13}$; and (4) correlating the $C^{12}/C^{13}$ isotopic ratio thus obtained with the normal $C^{12}/C^{13}$ isotopic ratio to determine abnormal fluctuations in said ratio from the normal which indicate an enrichment with respect to the $C^{12}$ isotope resulting from diffusion of methane from a deep reservoir.

8. A method in accordance with claim 7 in which said boat scans the water surface in a zigzag path.

9. A method in accordance with claim 7 in which said boat moves in a decreasing spiral path after methane is first detected.

10. A method for recovering oil from subsurface geological formations comprising (1) collecting terranean samples; (2) removing occluded and adsorbed gases from said samples; (3) quantitatively and qualitatively analyzing said gases for respective amounts of constituents containing isotopes selected from the group consisting of $H^1$, $H^2$, $C^{12}$, and $C^{13}$ whereby the ratio of the amount of a first, normally gaseous constituent containing a lower atomic weight isotope to the amount of a second, normally gaseous constituent, having the same composition as said first constituent but containing the higher-atomic-weight isotope of the same element, can be ascertained; (4) correlating these isotopic ratios with the normal ratio of the amount of said first constituent to the amount of said second constituent to ascertain abnormal fluctuations in said ratios which manifest the propinquity of subsurface accumulations of petroleum hydrocarbons; and (5) drilling at least one well in the region of greatest fluctuation of said ratio.

11. A method in accordance with claim 10 in which the gases from said samples are quantitatively and qualitatively analyzed for the respective amounts of methanes of molecular weights 16 and 17, respectively.

12. In a method for recovering oil from subsurface geological formations, the steps comprising (1) drilling a bore hole traversing subsurface formations; (2) collecting samples of gases at spaced points along the bore hole; (3) quantitatively and qualitatively analyzing said gases for respective amounts of constituents containing isotopes selected from the group consisting of $H^1$, $H^2$, $C^{12}$, and $C^{13}$ whereby the ratio of the amount of a first, normally gaseous, constituent containing a lower-atomic-weight isotope to the amount of a second, normally gaseous, constituent, having the same composition as said first constituent but containing the higher-atomic-weight isotope of the same element, can be ascertained; and (4) correlating these isotopic ratios with the normal ratios of the amount of said first constituent to the amount of said second constituent to ascertain abnormal fluctuations in said ratios and thereby manifest the propinquity of subsurface accumulations of petroleum hydrocarbons.

13. A method in accordance with claim 12 in which the gases from said samples are quantitatively and qualitatively analyzed for the respective amounts of methanes of molecular weights 16 and 17, respectively.

14. A method for recovering oil from subsurface geological formations comprising analyzing soil-gas samples taken over a predetermined surface area to determine the ratio of the carbon isotopes $C^{12}$ and $C^{13}$ therein, and drilling a well within the region of the maximum $C^{12}/C^{13}$ isotopic ratio.

15. A method for recovering oil from subsurface geological formations comprising (1) collecting terranean samples over a predetermined surface area; (2) removing occluded and adsorbed gases from said samples; (3) analyzing said gases to determine the relative amounts of $C^{12}H_4^1$ and $C^{13}H_4^1$ therein, and (4) drilling a well within the region of maximum $C^{12}H_4^1/C^{13}H_4^1$ ratio.

16. A subsurface geologic correlation method for tracing subterranean strata from one location to another which comprises (1) boring a plurality of wells at spaced intervals over a predetermined area, (2) collecting samples of the occluded and adsorbed gases from strata traversed by each of said wells, (3) quantitatively and qualitatively analyzing said gases for respective amounts of gaseous constituents containing isotopes selected from the group consisting of $H^1$, $H^2$, $C^{12}$, and $C^{13}$ whereby the ratio of the amount of a first, normally gaseous, constituent containing a lower-atomic-weight isotope to the amount of a second, normally gaseous, constituent, having the same composition as said first constituent but containing a higher-atomic-weight isotope of the same element, can be ascertained; and, (4) plotting, for each of said wells from which samples were obtained, the value of the isotopic ratio for each sample versus depth of well whereby a well log is obtained, and correlating the well logs from adjacent wells to determine the stratigraphic characteristics of the area surveyed.

17. The method in accordance with claim 16 in which the gases are analyzed for the respective amounts of methanes containing different isotopes of a constituent element.

18. A subsurface geologic correlation method for tracing subterranean strata from one location to another which comprises (1) boring a plurality of wells at spaced intervals over a predetermined area, (2) collecting samples of the strata traversed by each of said wells, (3) removing occluded and adsorbed gases from said samples; (4) quantitatively and qualitatively determining the respective amounts of methanes containing different isotopes of an element contained in said gases, whereby the ratio of amount of methane ($C^{12}H_4^1$) to the amount of heavy methane ($C^{13}H_4^1$) can be ascertained; and (5) plotting, for each of said wells from which samples were obtained, the value of the isotopic ratio for each sample versus depth of well, whereby a well log is obtained, and correlating the well logs from adjacent wells to determine the stratigraphic characteristics of the area surveyed.

19. A subsurface geologic correlation method for tracing subterranean strata from one location to another which comprises (1) boring a plurality of wells at spaced intervals over a predetermined area, (2) recovering a sample of occluded and adsorbed gas at preselected depths in each of said wells, (3) quantitatively and qualitatively analyzing said gas for respective amounts of gaseous constituents containing isotopes selected from the group consisting of $H^1$, $H^2$, $C^{12}$, and $C^{13}$ whereby the ratio of the amount of a first, normally gaseous constituent containing a lower-atomic-weight isotope to the amount of a second, normally gaseous constituent, having the same composition as said first constituent but containing a higher-atomic-weight isotope of the same element, can be ascertained; and (4) plotting, for each of said wells from which samples were obtained, the value of the isotopic ratio for each sample versus depth of well, whereby a well log is obtained, and correlating the well logs from adjacent wells to determine the stratigraphic characteristics of the area surveyed.

References Cited in the file of this patent

UNITED STATES PATENTS 2,773,991     Bray ------------------ Dec. 11, 1956

OTHER REFERENCES

West: Geophysics, vol. 10, 1945, pages 406–420.

Craig: Geochim. et Cosmochim. Acta, vol. 3, February 1953, pages 53 to 92; the more specific pages relied upon are 53, and 77 to 80.